United States Patent [19]
Flint et al.

[11] Patent Number: 5,130,660
[45] Date of Patent: Jul. 14, 1992

[54] MINIATURE ELECTRONIC DEVICE ALIGNER USING CAPACITANCE TECHNIQUES

[75] Inventors: Ephraim B. Flint, Garrison; Edward J. Yarmchuk, Somers, both of N.Y.

[73] Assignee: International Business Machines Corporation, Armonk, N.Y.

[21] Appl. No.: 679,412

[22] Filed: Apr. 2, 1991

[51] Int. Cl.⁵ .................................. G01R 27/26
[52] U.S. Cl. ..................... 324/662; 340/870.37; 437/924
[58] Field of Search .................. 324/660, 662, 661; 437/7-8, 924, 928; 340/870.37

[56] References Cited

U.S. PATENT DOCUMENTS

| | | | |
|---|---|---|---|
| 3,808,527 | 4/1974 | Thomas | 432/924 |
| 4,607,213 | 8/1986 | Neukermans et al. | 324/662 |
| 4,654,581 | 3/1987 | Neukermans et al. | 340/870.37 |
| 4,736,629 | 4/1988 | Cole | 324/661 |

*Primary Examiner*—Kenneth A. Wieder
*Assistant Examiner*—Maura K. Regan
*Attorney, Agent, or Firm*—Whitham & Marhoefer

[57] ABSTRACT

A method and structure permit the precision alignment in the packaging of optical components, such as lasers, detectors, lenses and waveguides. The technique involves capacitance measurements of an array of plates placed on the optoelectronic device chip and its package substrate. The technique uses phase sensitive detection to sense the total current capacitively coupled into a passive plate on the device chip from two overlapping plates located on the package substrate. When the device chip is properly aligned with respect to the package substrate, the summed current sensed with a third overlapping plate on the package substrate is a null.

14 Claims, 4 Drawing Sheets

MINIATURE ELECTRONIC DEVICE ALIGNER USING CAPACITANCE TECHNIQUES

BACKGROUND OF THE INVENTION

1. Field of the Invention

The present invention generally relates to the manufacture of miniature electronic devices and, more particularly, to a method and structure for the precision alignment of an integrated circuit (IC) chip on a package substrate. Such devices are typically a few microns to a tenth of micron in size and pose a critical problem in precise alignment during manufacture. The invention has particular application to the manufacture of optoelectronic (OE) devices. The technique permits, for example, precision laser-to-fiber or waveguide alignment in miniature OE devices.

2. Description of the Prior Art

The manufacture of miniature optoelectronic (OE) devices requires the precision alignment of optical devices such as lasers, detectors and lenses to optical fibers or waveguides. Such devices are in increasing demand in a variety of applications including communications and instrumentation. However, as optical devices are made increasingly smaller, the ability to quickly and easily align the optical components with precision has become increasingly difficult.

Generally, the prior art involves active or optical alignment steps in the assembly of an optoelectronic module. This type of operation requires that the device chip be electrically contacted and powered which is not possible in certain packaging configurations. Examples of the prior art techniques are disclosed in U.S. Pat. Nos. 4,807,956 to Tournereau et al., 4,764,983 to Walter, 4,756,590 to Forrest et al., and 4,755,017 to Kapany and in Japanese Patent No. 1-88404 to Hiroshiwada issued Apr. 3, 1989.

Other approaches have been taken in the prior art that do not require electrical connection to the device chip. One such approach is illustrated by U.S. Pat. No. 4,650,276 to Lanzisera et al. which describes a package that employs a cylindrical geometry to assist with alignment.

Another approach is described in U.S. Pat. No. 4,841,225 to Meyer. Meyer uses a digital capacitance system involving many electrodes resulting in a relatively complex structure which requires contact to both parts.

SUMMARY OF THE INVENTION

It is therefore an object of the present invention to provide a technique for the precision alignment of miniature electonic components during their manufacture.

It is a more specific object of the invention to provide a technique for the precision alignment of optoelectronic components, such as lasers, detectors, lenses and waveguides, on a package substrate.

It is another object of the invention to provide a structure which permits the precision alignment of optical components in the manufacturing and packaging of optoelectronic devices.

It is yet another object of the invention to provide a method of precision alignment of optical components that does not require a device chip to be electrically contacted and powered.

According to the invention, a method and structure for the precision alignment in the packaging of miniature electonic components and, in particular, optoelectronic components, such as lasers, detectors, lenses and waveguides, greatly enhances the precision of the manufacture of optoelectronic (OE) devices. Capacitance measurements of an array of plates placed on the optoelectronic device chip and its package are used to position the parts. The technique uses phase sensitive detection to sense the total current capacitively coupled into a plate located on the device chip from two overlapping plates located on the package which are driven at 180° relative phase. When the parts are properly aligned, the summed current sensed with a third overlapping plate on the package is zero. By locating the plates precisely with respect to the optical structures using lithographic techniques, precision optical alignment of device structures to light guides is possible.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
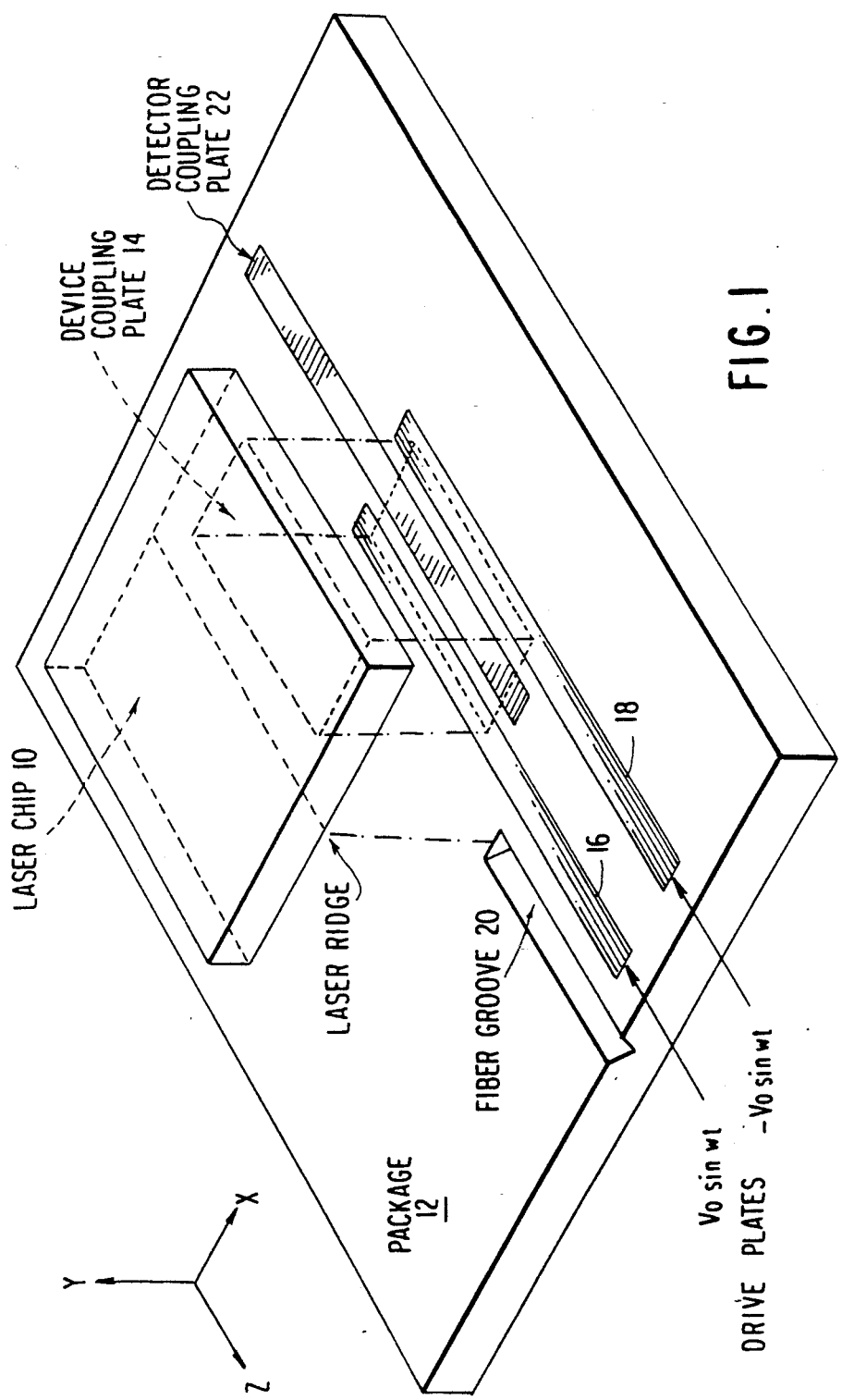
FIG. 1 is an exploded isometric view showing a laser chip and its package illustrating the basic principles of the capacitance alignment technique according to the invention.

Referring now to the drawings, and more particularly to FIG. 1, there is shown a flipped device chip 10, such as a laser chip or a detector chip, and a package substrate 12. A single capacitor plate 14 on the device chip is located precisely with respect to the device. The package substrate 12 has two differentially driven ($\pm V_0 \sin \omega t$) capacitor plates 16 and 18 aligned to a fiber groove 20. The capacitor plates 16 and 18 partially overlap the device capacitor plate 14 when the device chip 10 and the package substrate 12 are brought together forming two capacitors $C+$ and $C-$:

$$C\pm = \epsilon_i \epsilon_0 l \frac{(x_0 \pm x)}{d},$$

where $l$ is the overlap of the plates in the z direction, $x_0 \pm x$ are the overlaps in the x direction, and $\epsilon_i$ is the relative dielectric constant of the insulator and $\epsilon_0$ is the permitivity of free space. The third plate 22 on the substrate package completely overlaps the chip device plate 14 forming capacitor $C_c$, which couples the summed current to a detector. When $x=0$, $C+=C-$ and the summed current or detected signal is zero.

Figure 2:
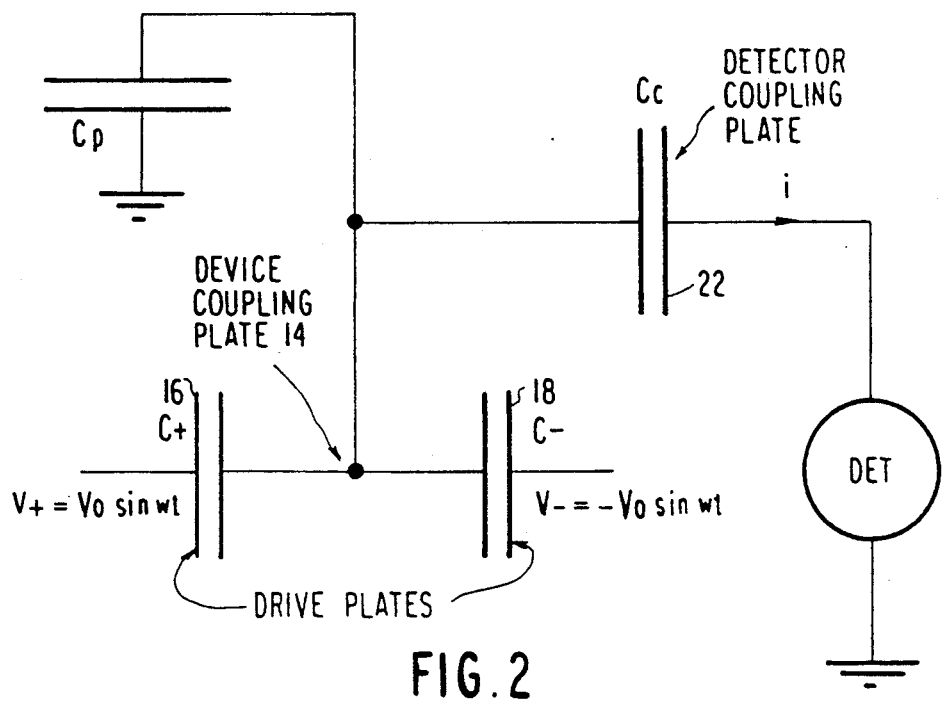
FIG. 2 is an electrical schematic diagram of the circuit model of the capacitance alignment structure shown in FIG. 1.

The sensitivity of the technique can be modeled using the circuit shown in FIG. 2. The drive plates are assumed to be sinusoidally driven:

$$V\pm = \pm V_0 \sin \omega t.$$

The imbalance in the current coupled to the device plate 14 is partially coupled through $C_c$ and is detected as a voltage drop across the 50Ω input impedance, R, of the lock-in detector. The remainder of the current is capacitively coupled to ground through the parasitic capacitance, $C_p$, formed by the device plate 14, an insulating layer and the grounded package substrate 12. While the parasitic capacitance, $C_p$, reduces the sensitivity, it does not shift the nulled position. In practice, an air gap is maintained with stand-offs between the parts so that the effective gap, $d_{eff}$, of the capacitors formed when the parts are put together is:

$$d_{eff} = d_i + \epsilon_r d_{air}.$$

With the air gap between the parts, the voltage, $V_d$, at the detector is:

$$V_d = \frac{2V_0 \omega R \epsilon_0 \epsilon_i \frac{lx}{d_{eff}}}{1 + \left( \frac{2lx_0}{A_c} + \frac{d_{eff}}{d_i} \frac{A_p}{A_c} \right)}.$$

Here, $A_c$ and $A_p$ are the areas of the capacitors $C_c$ and $C_p$, respectively, and $d_i$ is the thickness of the device substrate insulator. The sensitivity of the technique scales linearly with drive voltage and frequency.

Experimental data has been developed to demonstrate the operation of the invention. Test parts were fabricated on silicon substrates using silicon dioxide and epoxy as the insulating layers. The actual plate pattern is shown in FIG. 3 and was designed to reduce the sensitivity to tilt of the device with respect to the substrate package.

More specifically, the two drive plates 16 and 18 are placed close together in order to minimize the space between these plates. This geometry minimizes the sensitivity of the measurement to tilt. The detector coupling plate 22 can be placed at any convenient location on the device. It is only necessary that the device coupling plate 14 be overlapped by the drive plates 16 and 18 and the detector coupling plate 22. In the example shown, this is accomplished by the "U" shaped geometry of the device coupling plate 14 wherein one leg of the "U" is overlapped by the drive plates 16 and 18 and the other leg overlies the detector coupling plate 14. Although the sensitivity to tilt is greatly reduced with this geometry, there is no trade-off in sensitivity, only initial placement accuracy.

Figure 3:
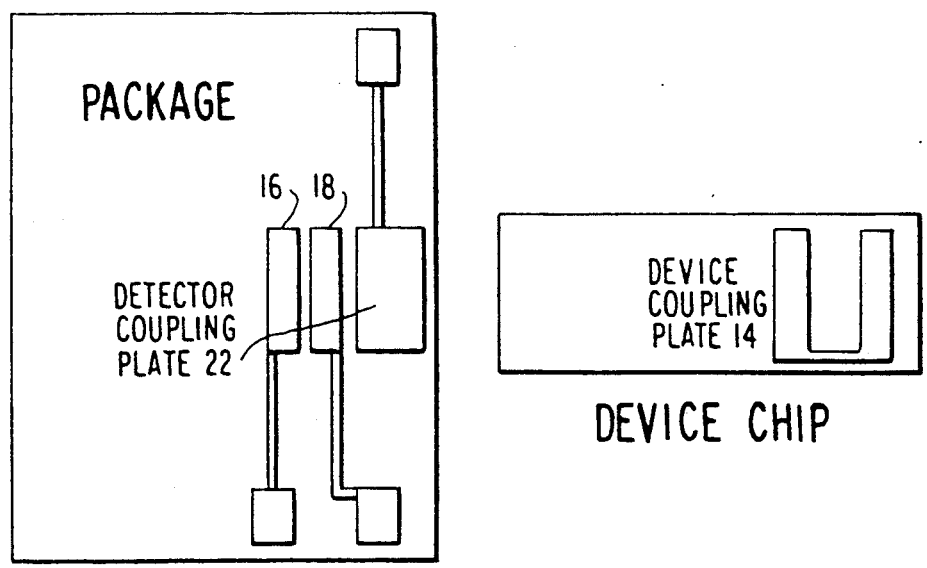
FIG. 3 is a plan view of a specific embodiment of a device chip and package substrate showing the pattern of capacitive plates.

In the implemented example illustrated in FIG. 3, the device decoupling plate 14 occupied an area of 460 $\mu m \times 480$ $\mu m$ on the device 10. Stand-off rails were patterned in epoxy and measured with a Dektak profiler. The resulting air gap should have been between 0.8 $\mu m$ and 1.0 $\mu m$, but could have been greater due to imperfections in the spun-on epoxy films.

Figure 4:
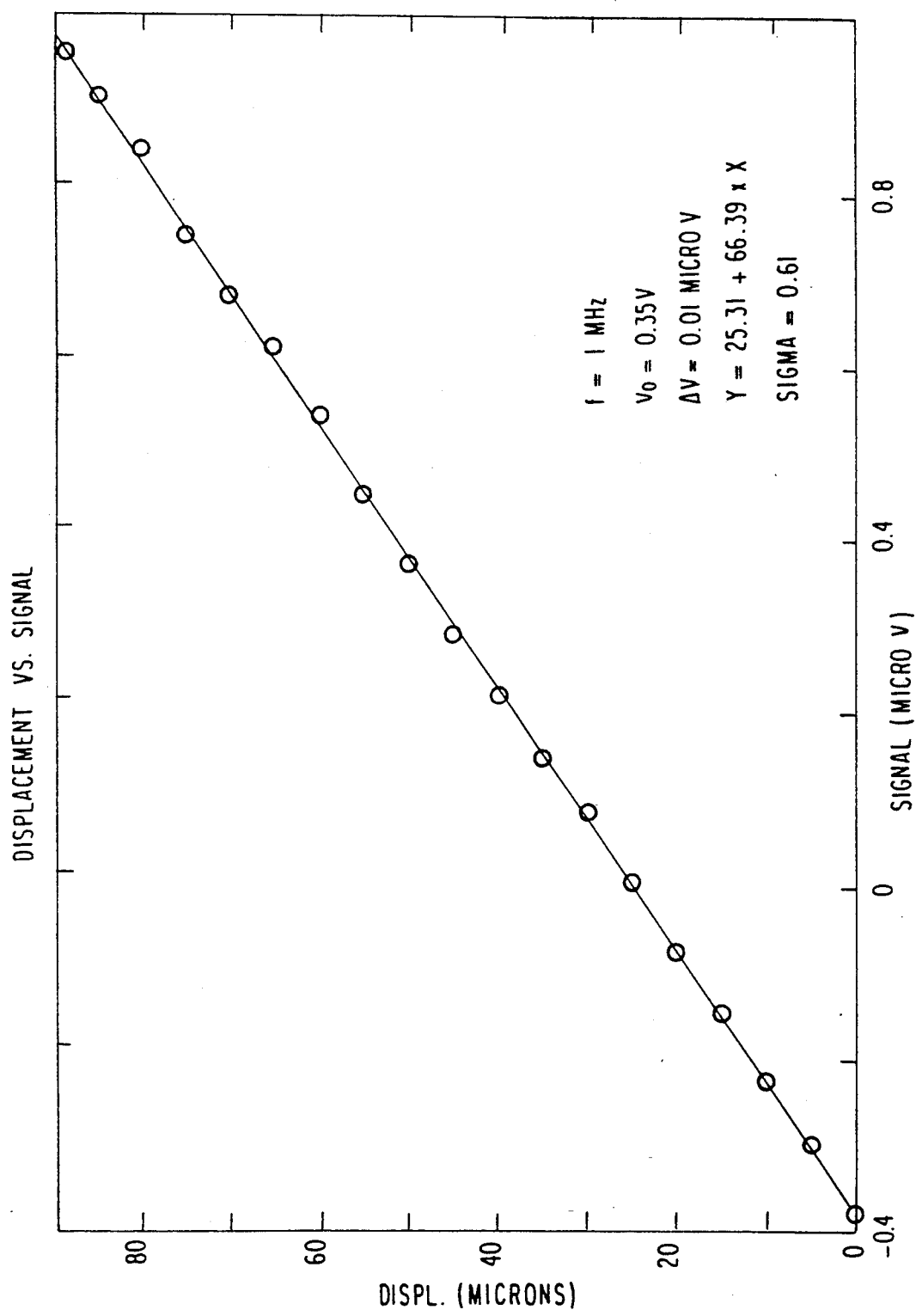
FIG. 4 is a graph showing a plot of the measured values using the experimental device chip and package substrate showing data as displacement as a function of signal.

The parts were brought into alignment with micropositioners and displaced along the x axis to measure the sensitivity of the system. The drive plates 16 and 18 were driven with 0.35 $V_{rms}$ signals at 1 MHz. The detected signal was amplified with a PARC 5202 lock-in amplifier. Measurements of displacement as a function of the detected voltage are shown in FIG. 4. A straight line fit to the data yields a sensitivity of $$66 \frac{\mu m}{\mu V}$$

which, according to the sensitivity model, corresponds to an air gap of 1.4 $\mu m$. The noise level of the instrumentation is 0.01 $\mu V$, so it is possible to resolve displacements of less than 1 $\mu m$ under these conditions.

The capacitances $C^+$ and $C^-$ depend strongly on any air gap between the parts. Differences in their gaps will result in a misalignment which is proportional to the amount of tilt. For example, a tilt (rotation about the z axis) of 0.5 $\mu m$ across the 500 $\mu m$ part produces a gap difference of 0.07 $\mu m$ between $C^+$ and $C^-$. This could produce a misalignment of 1 $\mu m$ for the experimental geometry. For a given tilt angle, the amount of error can be reduced by increasing the air gap (at the expense of sensitivity) or by reducing the distance between the drive plates. The ultimate constraint on the latter is the initial accuracy to which the parts are placed for the experimental geometry, a $\pm 50$ $\mu m$ initial placement is required. Optimizing the design and reducing the placement to $\pm 25$ $\mu m$ reduces the misalignment to 0.25 $\mu m$ without a loss of sensitivity.

Figure 5:
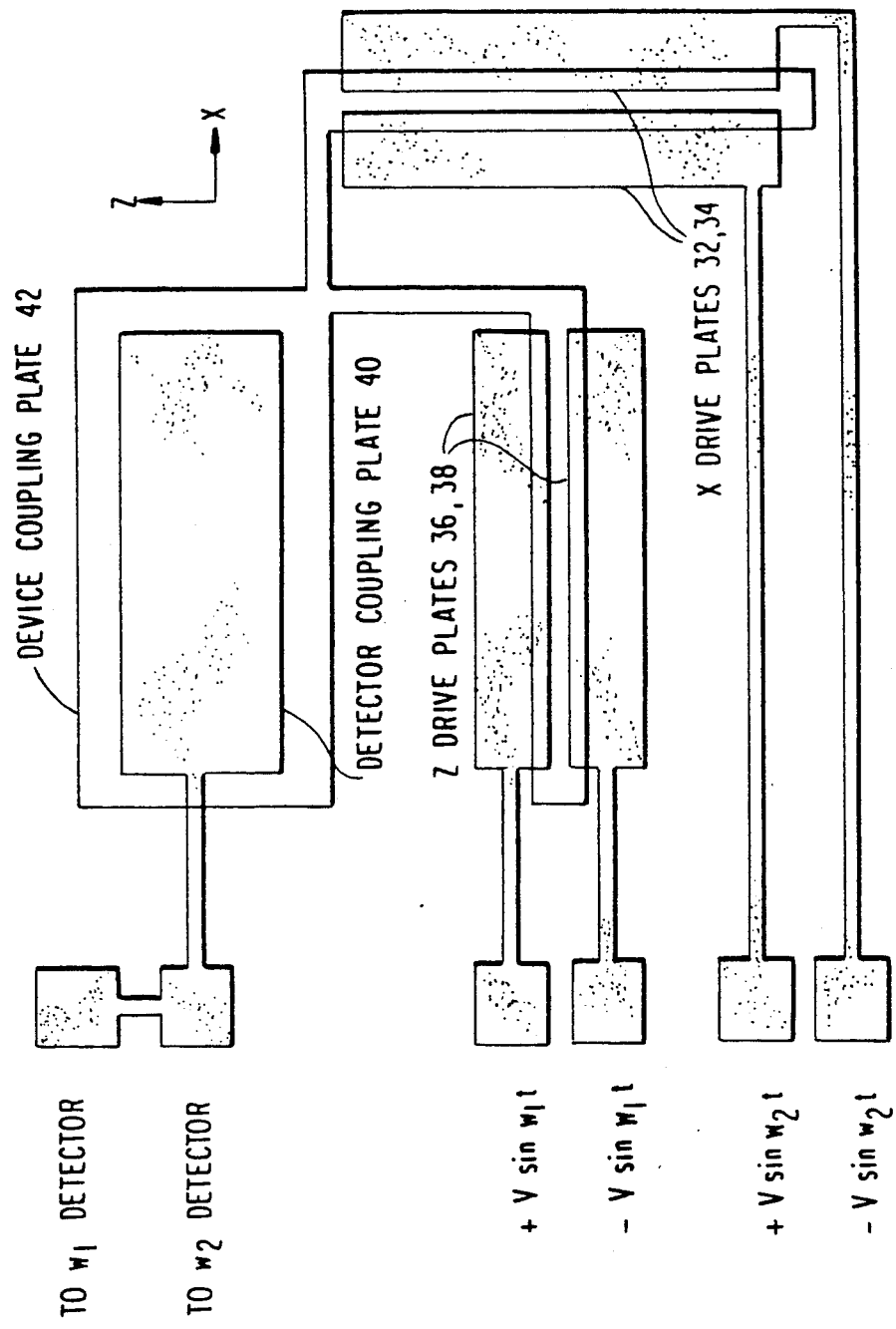
FIG. 5 is a plan view showing the application of the alignment technique according to the invention to positioning in two dimensions.

The invention is capable of permitting precise alignments in two dimensions as well as one. An embodiment which allows this is shown in FIG. 5. A first pair of drive plates 32, 34 perpendicular to the x-axis are used to position the device in that axis, while second pair of drive plates 36, 38 perpendicular to the z-axis are used to position the device in that axis. The drive plates 32, 34 are driven by signals $\pm V \sin \omega_2 t$ (i.e., 180° out of phase with one another), and the drive plates 36, 38 are driven by signals $\pm V \sin \omega_1 t$ (i.e., 180° out of phase with one another). The frequencies $f_1$ and $f_2$ (where $\omega = 2\pi f$) are chosen so that detectors, tuned to the two different frequencies, each sense the off-null current arising from displacement in one direction only.

In the embodiment shown in FIG. 5, only a single detector coupling plate 40 is required. This minimizes the area on the package substrate dedicated to the capacitive plate patterns. This same economy of area is also realized on the device, as indicated by the outline of the device coupling plate 42. It will, of course, be understood that this geometry may be modified without losing the benefit of the overall design. Further, it will be observed that this particular geometry, like that of FIG. 3, has reduced sensitivity to tilt, but now in two dimensions rather than just one as before.

The capacitance technique according to the invention has been demonstrated to be capable of resolving one micron displacements. Since the sensitivity of the technique scales linearly with drive voltage and frequency, improvement factors of twenty or more in sensitivity should be achievable. Insulators used in these devices should withstand 5V and the frequency of the lock-in used extends to 50 MHz. The measurements reported represent a design point with displacement resolution of better than 1 $\mu m$ and with systematic errors of about 1 $\mu m$, assuming a gap variation of 0.5 $\mu m$ in 500 $\mu m$. By increasing the air gap, the drive voltage and the frequency, it should be possible to achieve submicron alignments.

A combination of features provides a practical solution to the problem of optoelectronic device alignment.

The use of a passive coupling plate on the device chip allows the chip to be mounted face down. This confers a significant advantage over the obvious capacitive coupling schemes which require direct electrical contact to both the device chip and the package substrate. The addition of the detector coupling plate to capacitively couple to the device chip is the feature that allows this to be done. The use of two differentially driven drive plates eliminates most of the sources of systematic error that plague typical capacitance measurement methods, such as parasitic capacitance and dependance on gap.

The last remaining systematic error of any practical significance is a higher order effect from the tilt of the device with respect to the package substrate. The novel features of this invention that greatly reduce this are best illustrated by the preferred embodiments shown in FIGS. 3 and 5. The layout of the plates is chosen to minimize the spatial separation of the drive plates of the capacitors $C^+$ and $C^-$. A given amount of tilt will produce an alignment error that is proportional to this separation, so smaller separations are better. Two key concepts that allow for very small separations are the close proximity of the drive plates on the package (by moving the detector plate from between them) and minimizing the amount of overlap of the device coupling plate to the drive plates. The overlap dictates the size of the effective capacitor plates which, in turn, affects the center-to-center separation of the pair. The amount of overlap determines the dynamic range of motion that can be accommodated and is constrained by the initial device placement tolerance. Reduction of the overlap is counter intuitive in a capacitance transducer because it reduces signal. However, in this invention, the relevant signal is actually proportional to the derivative of the capacitance with respect to position and not the capacitance itself.

Another important design principle of this invention is the addition of an air gap to reduce tilt sensitivity even further. A given amount of tilt will produce an alignment error proportional to the gap difference of $C^+$ and $C^-$ divided by the nominal gap. Thus, large gaps reduce tilt sensitivity. This not an obvious addition to a capacitive transducer design because increasing the gap reduces signal. The extra air gap is one of the novel features that allows the achievement of lower systematic errors by trading off absolute sensitivity, which is higher than required.

While the invention has been described in terms of preferred embodiments which allow the precise alignment of miniature parts in one and two dimensions, it is possible to extend the teaching of the invention to three dimensions and, therefore, those skilled in the art will recognize that the invention can be practiced with modification within the spirit and scope of the appended claims.

Having thus described our invention, what we claim as new and desire to secure by Letters Patent is as follows:

1. A structure for miniature electronic device alignment comprising:
   a passive coupling plate on a device chip, said device chip being mounted face down on a package substrate;
   first and second drive plates on said package substrate, said first and second drive plates overlapping said passive coupling plate when said device chip is positioned for mounting on said package substrate;
   means for driving said first and second drive plates with alternating voltages of opposite phases;
   a detector coupling plate on said package substrate, said detector coupling plate at least partially overlapping said passive coupling plate when said device chip is positioned for mounting on said package substrate; and
   means for sensing a current in said detector coupling plate, said sensed current being a null when said device chip is properly aligned with respect to said package substrate.

2. The structure recited in claim 1 wherein said detector coupling plate is located intermediate said first and second drive plates.

3. The structure recited in claim 1 wherein said first and second drive plates are positioned immediately adjacent one another with minimum spacing to minimize sensitivity to tilt, said detector coupling plate is located apart from said first and second drive plates, and said passive coupling plate on said device chip has a geometry conforming to the placement of said first and second drive plates and said detector coupling plate.

4. The structure recited in claim 3 further comprising means to establish an air gap between said first and second drive plates and said passive coupling plate to further minimize sensitivity to tilt.

5. The structure recited in claim 1 further comprising:
   third and fourth drive plates on said package substrate, said third and fourth drive plates being oriented perpendicular to said first and second drive plates; and
   second means for driving said third and fourth drive plates with alternating voltages of opposite phases and a frequency different from that of the voltages applied to said first and second drive plates;
   said means for sensing currents in said detector coupling plate being sensitive to different frequencies.

6. The structure recited in claim 5 wherein said detector coupling plate is a single plate.

7. The structure recited in claim 5 wherein said first and second drive plates are positioned immediately adjacent one another and said third and fourth drive plates are positioned immediately adjacent one another, each with minimum spacing to minimize sensitivity to tilt, said detector coupling plate is located apart from said first and second and from said third and fourth drive plates, and said passive coupling plate on said device chip has a geometry conforming to the placement of said first and second and said third and fourth drive plates and said detector coupling plate.

8. The structure recited in claim 7 further comprising means to establish an air gap between said first and second drive plates and said passive coupling plate and between said third and fourth drive plates and said passive coupling plate to further minimize sensitivity to tilt.

9. A method for the alignment of a miniature electronic device with respect to a substrate package comprising the steps of:
   applying a passive coupling plate on a device chip;
   applying first and second drive plates on said package substrate;
   applying a detector coupling plate on said package substrate;

positioning said device chip for mounting face down on said package substrate so that said passive coupling plate is overlapped by said first and second drive plates and said detector coupling plate;

driving said first and second drive plates with alternating voltages of opposite phases; and sensing a current in said detector coupling plate, said sensed current being a null when said device chip is properly aligned with respect to said package substrate.

10. The method recited in claim 9 wherein said first and second drive plates are positioned immediately adjacent one another with minimum spacing to minimize sensitivity to tilt, said detector coupling plate is located apart from said first and second drive plates, and said passive coupling plate on said device chip has a geometry conforming to the placement of said first and second drive plates and said detector coupling plate.

11. The method recited in claim 10 further comprising the step of establishing an air gap between said first and second drive plates and said passive coupling plate to further minimize sensitivity to tilt.

12. The method recited in claim 10 further comprising the steps of:

applying third and fourth drive plates on said package substrate, said third and fourth drive plates being oriented perpendicular to said first and second drive plates;

driving said third and fourth drive plates with alternating voltages of opposite phases and a frequency different from that of the voltages applied to said first and second drive plates; and sensing currents in said detector coupling plate at different frequencies to detect when said device chip is properly aligned in two dimensions.

13. The method recited in claim 12 wherein said first and second drive plates are positioned immediately adjacent one another and said third and fourth drive plates are positioned immediately adjacent one another, each with minimum spacing to minimize sensitivity to tilt, said detector coupling plate is located apart from said first and second and from said third and fourth drive plates, and said passive coupling plate on said device chip has a geometry conforming to the placement of said first and second and said third and fourth drive plates and said detector coupling plate.

14. The method recited in claim 13 further comprising the step of establishing air gaps between said first and second drive plates and said passive coupling plate and between said third and fourth drive plates and said passive coupling plate to further minimize sensitivity to tilt.

* * * * *